United States Patent
Ishii et al.

(10) Patent No.: US 8,126,277 B2
(45) Date of Patent: Feb. 28, 2012

(54) IMAGE PROCESSING METHOD, IMAGE PROCESSING APPARATUS AND IMAGE PICKUP APPARATUS USING THE SAME

(75) Inventors: Yasuo Ishii, Gifu (JP); Mitsuru Suzuki, Kariya (JP); Shigeyuki Okada, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 1036 days.

(21) Appl. No.: 12/073,047

(22) Filed: Feb. 28, 2008

(65) Prior Publication Data

US 2008/0212886 A1 Sep. 4, 2008

(30) Foreign Application Priority Data

Feb. 28, 2007 (JP) .................................. 2007-050104
Jul. 10, 2007 (JP) .................................. 2007-181365

(51) Int. Cl.
*G06K 9/36* (2006.01)

(52) U.S. Cl. ...................................................... 382/232

(58) Field of Classification Search .................. 382/232, 382/236, 238, 239, 248–253; 348/394.1–395.1, 348/403.1–404.1, 407.1–421.1; 375/340.12–240.24
See application file for complete search history.

(56) References Cited

U.S. PATENT DOCUMENTS 5,150,432 A * 9/1992 Ueno et al. .................... 382/250
(Continued)

FOREIGN PATENT DOCUMENTS

JP 3-127581 5/1991
(Continued)

OTHER PUBLICATIONS

Japanese Notification of Reason(s) for Refusal, w/ English translation thereof, issued in Japanese Patent Application No. JP 2007-181365 dated Feb. 10, 2009.

(Continued)

*Primary Examiner* — Jose Couso
(74) *Attorney, Agent, or Firm* — McDermott Will & Emery LLP

(57) ABSTRACT

A correlation evaluation unit evaluates a correction between a predetermined region in a targeted picture and a region corresponding to the region in a picture differing from the targeted picture in a temporal direction. A quantization control unit adaptively controls quantization processing for the predetermined region in the targeted picture, according to an evaluation obtained by the correlation evaluation unit. For example, when it is determined by an evaluation value obtained by the correlation evaluation unit that the correlation is weaker than a predetermined threshold value, the quantization control unit enlarges a quantization step used for quantization of the predetermined region.

7 Claims, 5 Drawing Sheets

U.S. PATENT DOCUMENTS 5,852,470 A * 12/1998 Kondo et al. ................ 348/448
6,040,865 A * 3/2000 Kato et al. ............... 375/240.16

FOREIGN PATENT DOCUMENTS

| | | |
|---|---|---|
| JP | 04-329089 | 11/1992 |
| JP | 7-236146 | 9/1995 |
| JP | 8-181992 | 7/1996 |
| JP | 10-276438 | 10/1998 |
| JP | 2002-238060 | 8/2002 |

OTHER PUBLICATIONS

Japanese Decision of Refusal, with English Translation, issued in Japanese Patent Application No. JP 2007-181365, dated Jun. 9, 2009.

* cited by examiner

IMAGE PROCESSING METHOD, IMAGE PROCESSING APPARATUS AND IMAGE PICKUP APPARATUS USING THE SAME

CROSS-REFERENCE TO RELATED APPLICATIONS

This application is based upon and claims the benefit of priority from the prior Japanese Patent Applications No. 2007-050104, filed Feb. 28, 2007, and Japanese Patent Application No. 2007-181365, filed Jul. 10, 2007, the entire contents of which are incorporated herein by reference.

BACKGROUND OF THE INVENTION

1. Field of the Invention

The present invention relates to an image processing method and an image processing apparatus for coding moving images and an image pickup apparatus using the same.

2. Description of the Related Art

Digital video cameras are now in wide use. Moving images taken by the digital video camera are generally recorded in MPEG (Moving Picture Experts Group) format. In the digital video cameras using the recording format such as MPEG format, the images shot by them are quantized and then compressed and coded. Quantization is a processing that affects the image quality and the amount of codes. If a quantization step is increased, the amount of codes can be reduced but the image quality will drop. Conversely, if the quantization step is reduced, the recording can be done in high quality but the amount of codes will increase.

The quantization step is generally determined based on the buffer occupancy (buffer fullness) and the amount of codes in each macroblock.

However, when the quantization step is simply determined based on the buffer occupancy and the like, there are cases where the amount of codes in a region of interest to a viewer is reduced and, conversely, an unduly large amount of codes is allocated to such a region as one having a large variation in which a subjective image quality may not be very improved even when the image is converted into a high quality image.

SUMMARY OF THE INVENTION

An image processing method according to one embodiment of the present invention is such that a correlation between a predetermined region in a targeted picture and a region corresponding to a picture differing from the targeted picture in a temporal direction is evaluated and a content of processing for the predetermined region in the targeted picture is adaptively varied.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

Figure 1:
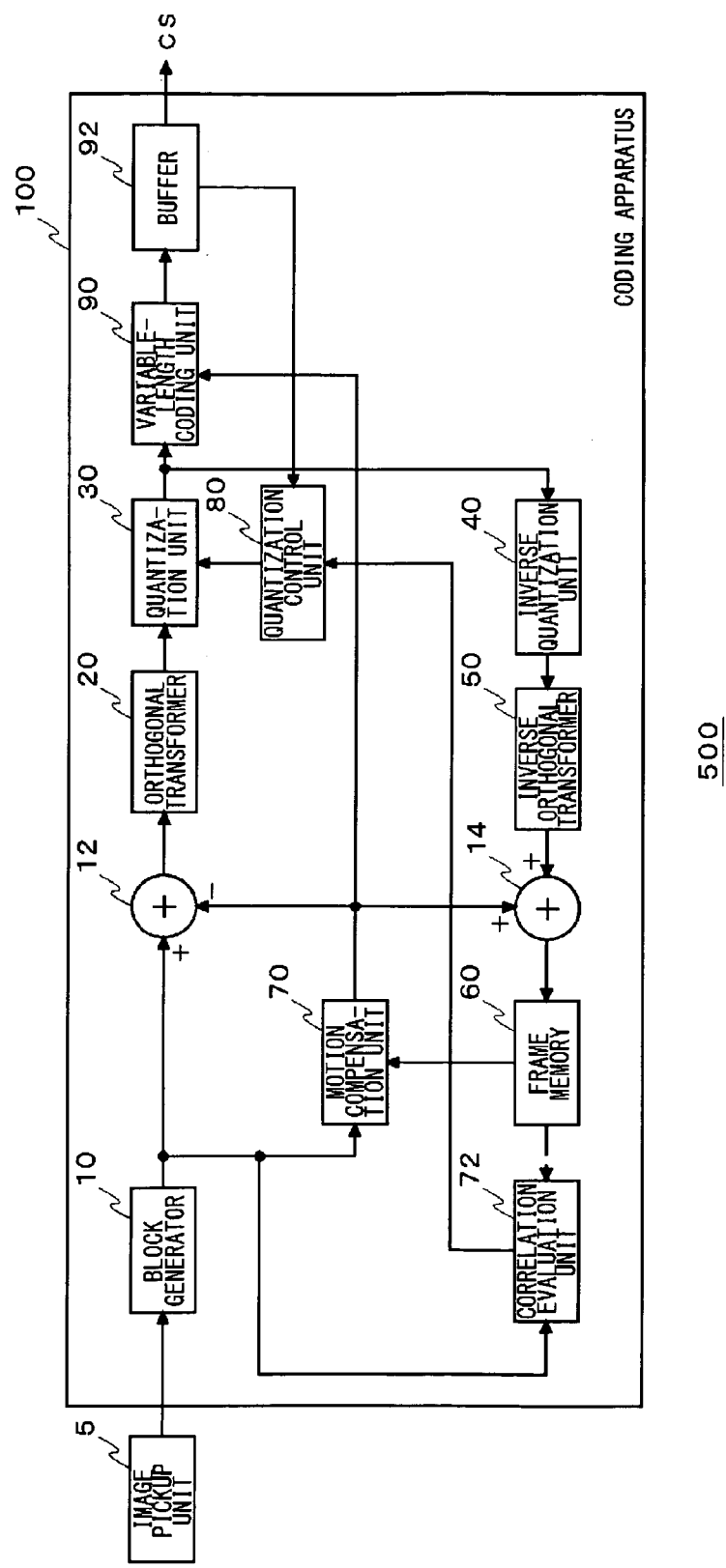
FIG. 1 illustrates a structure of an image pickup apparatus according to an embodiment of the present invention.

The invention will now be described by reference to the preferred embodiments. This does not intend to limit the scope of the present invention, but to exemplify the invention.

A description of a typical embodiment will be given before describing a detailed description of embodiments of the present invention. An image processing method according to one embodiment of the present invention is such that a correlation between a predetermined region in a targeted picture and a region corresponding to a region in a picture differing from the targeted picture in a temporal direction is evaluated and a content of processing for the predetermined region in the targeted picture is adaptively varied. "Picture" means a unit of coding, and the concept thereof may include a field, a VOP (Video Object Plane) and the like. The "predetermined region" may be a macroblock. The "picture differing . . . in a temporal direction" may be a picture in the past or in the future.

According to this embodiment, a predetermined region in the targeted picture is coded by referring to the correlation between the predetermined region in the targeted picture and a region corresponding to a picture differing from the targeted picture in the temporal direction. Thus, it is also possible to perform different coding processing for each region, thereby enabling the coding that suppresses the amount of codes and improves the subjective image quality.

Another embodiment of the present invention relates also to an image processing apparatus. This apparatus comprises: a correlation evaluation unit which evaluates a correlation between a predetermined region in a targeted picture and a region corresponding to a picture differing from the targeted picture in a temporal direction; and a quantization control unit which adaptively controls quantization processing for the predetermined region in the targeted picture, according to an evaluation obtained by the correlation evaluation unit.

According to this embodiment, parameters for the quantization processing are adaptively varied by referring to the correlation between the predetermined region in the targeted picture and a region corresponding to a picture differing from the targeted picture in the temporal direction. Thus, it is possible to enhance the subjective image quality while the amount of codes is suppressed.

When it is determined by an evaluation value obtained by the correlation evaluation unit that the correlation is weaker than a predetermined threshold value, the quantization control unit may enlarge a quantization step used for quantization of the predetermined region. According to this embodiment, in a region where it is determined that the reduction in the code amount does not reduce the subjective image quality very much, the amount of codes can be reduced by enlarging the quantization step.

When it is determined by an evaluation value obtained by the correlation evaluation unit that the correlation is stronger than a predetermined threshold value, the quantization control unit may reduce a quantization step used for quantization of the predetermined region. According to this embodiment, in a region determined to be easily noticeable by a viewer, the reduction in quantization step can enhance the image quality.

When it is determined by an evaluation value obtained by the correlation evaluation unit that the correlation is weaker than a predetermined threshold value, the quantization control unit may truncate a fraction produced in a division processing for quantization of the predetermined region. According to this embodiment, in a region where it is determined that the reduction in the code amount does not reduce the subjective image quality very much, the truncation of the fraction produced in a division processing at the time of quantization can enhance the image quality.

When it is determined by an evaluation value obtained by the correlation evaluation unit that the correlation is stronger than a predetermined threshold value, the quantization control unit may round off a fraction produced in a division processing for quantization of the predetermined region. According to this embodiment, in a region determined to be easily noticeable by a viewer, rounding off the fraction produced in a division processing at the time of quantization can record an image close to the original image.

Still another embodiment of the present invention relates also to an image processing apparatus. This apparatus comprises: a motion detector which searches a prediction region corresponding to a predetermined region in a targeted picture, in a picture differing from the targeted picture in a temporal direction and which determines the predetermined region by referring to evaluation values of the respective prediction region candidates; and a quantization control unit which adaptively controls quantization processing for the predetermined region in the targeted picture, by using at least one of the evaluation values. The "at least one of the evaluation values" may be an evaluation value of the prediction region determined by the motion detector.

According to this embodiment, the parameters for the quantization processing are adaptively varied by the use of the evaluation values generated to search prediction regions, thereby making it possible to enhance the subjective image quality while the amount of codes is suppressed. This embodiment also eliminates the need of calculating separately an evaluation value that represents inter-picture correction, thereby reducing the amount of calculation.

The motion detector may generate the evaluation values for both a picture to be inter-picture coded and a picture to be intra-picture coded. In this manner, the motion detector is used to generate the pictures to be intra-picture coded, so that the evaluation values used in the quantization processing can be generated regardless of the types of frames.

Still another embodiment of the present invention relates to an image pickup apparatus. This apparatus comprises: image pickup devices; and an image processing apparatus according to any one of the above-described image processing apparatus, wherein the image processing apparatus performs the quantization processing on pictures taken in from the image pickup devices.

By implementing this embodiment, an image pickup apparatus capable of enhancing the subjective image quality with a suppressed amount of codes can be constructed.

Arbitrary combinations of the aforementioned constituting elements, and the implementation of the present invention in the form of a method, an apparatus, a system, a recoding medium, a computer program and so forth may also be effective as and encompassed by the embodiments of the present invention.

The preferred embodiments are now described in detail. FIG. 1 illustrates a structure of an image pickup apparatus 500 according to an embodiment of the present invention. The image pickup apparatus 500 includes an image pickup unit 5 and a coding apparatus 100. The structure of the coding apparatus 100 may be implemented hardwarewise by elements such as a CPU, memory and other LSIs of an arbitrary computer, and softwarewise by memory-loaded programs having a function of coding the images or the like. Depicted herein are functional blocks implemented by cooperation of hardware and software. Therefore, it will be obvious to those skilled in the art that the functional blocks may be implemented by a variety of manners including hardware only, software only or a combination of both.

The image pickup unit 5, which includes image pickup devices such as CCD (Charge-Coupled Devices) sensors and CMOS (Complementary Metal-Oxide Semiconductor) image sensors, converts images picked up by the image pickup devices into electric signals and outputs them to the image coding apparatus 100 as moving images. The coding apparatus 100 receives the moving images in units of frame, codes the moving images, and outputs a codestream CS.

The coding apparatus 100 according to the present embodiment codes the moving images in compliance with MPEG series standards (MPEG-1, MPEG-2 and MPEG-4) standardized by the International Organization for Standardization (ISO)/International Electrotechnical Commission (IEC), H.26x series standards (H.261, H.262 and H.263) standardized by the International Telecommunication Union-Telecommunication Standardization Sector (ITU-T) or H.264/AVC which is standardized in cooperation with each standardization organization (where the formal recommendations by the both organizations are called MPEG-4 Part 10: Advanced Video Coding and H.264, respectively).

In the MPEG series standards, an image frame in which an intra-frame coding is performed is called an I (Intra) frame; an image frame in which an inter-frame predictive coding in the forward direction is performed by using a frame in the past as a reference frame is called a P (Predictive) frame; and an image frame in which an inter-frame predictive coding in the both directions are performed by using frames in the past and the future as reference frames is called a B (Bi-directionally predictive) frame.

On the other hand, in 264/AVC, frames which can be used as reference images may be two frames in the past or two frames in the future regardless of the temporal direction. The number of frames used as the reference images does not matter and thus three or more frames may be used as the reference images. Thus, it is to be noted here that although a B frame indicates a bi-directional prediction frame in the MPEG-1/2/4, the B frame indicates a bi-predictive prediction frame in H.264/AVC regardless of the temporal direction in the reference image.

In this patent specification, "frame" and "picture" are used interchangeably. Thus, I frame, P frame and B frame may be called I picture, P picture and B picture, respectively.

Although, in this patent specification, a description is given of an example where "frame" serves as the unit of coding, the unit of coding may be "field" instead. Also, the unit of coding may be VOP in MPEG-4.

A block generator 10 divides an inputted image frame into macroblocks. Macroblocks are formed in the direction from the upper-left to the lower-right position of an image frame. The block generator 10 supplies the thus generated macroblocks to a differencer 12, a motion compensation unit 70 and a correlation evaluation unit 72.

If the image frame supplied from the block generator 10 is an I frame, it will be outputted directly to an orthogonal transformer 20. If the image frame supplied from the block generator is a P frame or B frame, a difference thereof from a predictive image supplied from the motion compensation unit 70 will be calculated and then supplied to the orthogonal transformer 20.

The motion compensation unit 70 uses frames in the past or the future stored in a frame memory 60, as the reference images. And for each macroblock of P frame or B frame inputted from the block generator 10, the motion compensation unit 70 searches, from at least one reference image, a prediction region having the minimum error and then obtains a motion vector indicating a displacement from the macroblock to the prediction region. For each macroblock the motion compensation unit 70 compensates for a motion by using the motion vector so as to generate a predictive image. The motion compensation unit 70 supplies the thus generated motion vector to a variable-length coding unit 90 and supplies the predictive image to the differencer 12 and an adder 14.

Either one of bi-directional prediction and uni-directional prediction is applicable in the motion compensation unit 70. In the uni-directional prediction, the motion compensation unit 70 generates a forward motion vector that indicates a motion for an anterior reference frame. In the bi-directional prediction, the motion compensation unit 70 generates, in addition to the forward motion vector, a backward motion vector for a posterior reference frame; that is, the total of two motion vectors are generated.

The differencer 12 obtains a difference between the current image outputted from the block generator 10, namely an image to be coded, and a prediction image outputted from the motion compensation unit 70, and outputs the difference to the orthogonal transformer 20. The orthogonal transformer 20 performs discrete cosine transform (DCT) on a difference image supplied from the differencer 12 so as to supply DCT coefficients to a quantization unit 30.

The quantization unit 30 quantizes the DCT coefficients by the quantization step set by a quantization control unit 80 and outputs the quantized coefficients to the variable-length coding unit 90. The variable-length coding unit 90 performs variable-length coding on the quantized DCT coefficients of the difference image together with the motion vectors sent from the motion compensation unit 70 so as to generate a codestream CS. A buffer 92 stores temporarily the codestream CS and records it, at predetermined timing, in a recording medium such as a memory card, a hard disk or a DVD, or delivers it to a network. The buffer 92 conveys the code amount of the codestream CS or the buffer occupancy of the codestream CS to the quantization control unit 80.

The quantization unit 30 supplies the quantized DCT coefficients of image frames to an inverse quantization transformer 40. The inverse quantization transformer 40 inverse-quantizes the given quantization data and sends them to an inverse orthogonal transformer 50, which in turn performs inverse cosine transform on the given inverse quantization data. As a result, the coded image frames are restored. The thus restored image frames are inputted to the adder 14.

If the image frame supplied from the inverse orthogonal transformer 50 is an I frame, the adder 14 will store it directly in the frame memory 60. If the image frame supplied from the inverse orthogonal transformer 50 is a P frame or a B frame, it will a difference image. Thus, the adder 14 adds up the difference image supplied from the inverse orthogonal transformer 50 and the prediction image supplied from the motion compensation unit 70, so that the original image frame is reconstructed and stored in the frame memory 60.

In the case when P frames or B frames are coded, the motion compensation unit 70 operates as described above. However, in the case when I frames are coded, the motion compensation unit 70 is not activated; and though not shown here, the I frames are subjected to the intra-frame prediction and then is supplied to the orthogonal transformer 20.

The correlation evaluation unit 72 evaluates the correlation between a small region of the current frame and a small region corresponding to a frame differing from said current frame in the temporal direction. The small region may be a macroblock; and it may also be a region larger than or smaller than the macroblock.

The frame differing from the above-mentioned current frame in the temporal direction may be a frame immediately before or a frame immediately after the current frame. Also, it may be a frame which is two or more frames in the past from the current frame or an average value of a plurality of frames in the past. Also, a plurality of correlations between the current frame and a plurality of frames in the past or in the future may be calculated. A frame differing from said current frame in the temporal direction, which is to be compared with the above-mentioned current frame, may be a reference image, which has undergone the inverse quantization and the inverse orthogonal transform after the quantization, or an original image.

The correlation evaluation unit 72 supplies a value evaluated based on the above correlation, to the quantization control unit 80. A method for evaluation will be described later in detail. The quantization control unit 80 adaptively varies the quantization step in response to the evaluated value given from the correlation evaluation unit 72, and supplies it to the quantization unit 30. Also, the quantization control unit 80 adaptively varies the rounding method for values in the quantization in response to the evaluated value given from the correlation evaluation unit 72, and supplies it to the quantization unit 30. These processings will be discussed later in detail.

Figure 2:
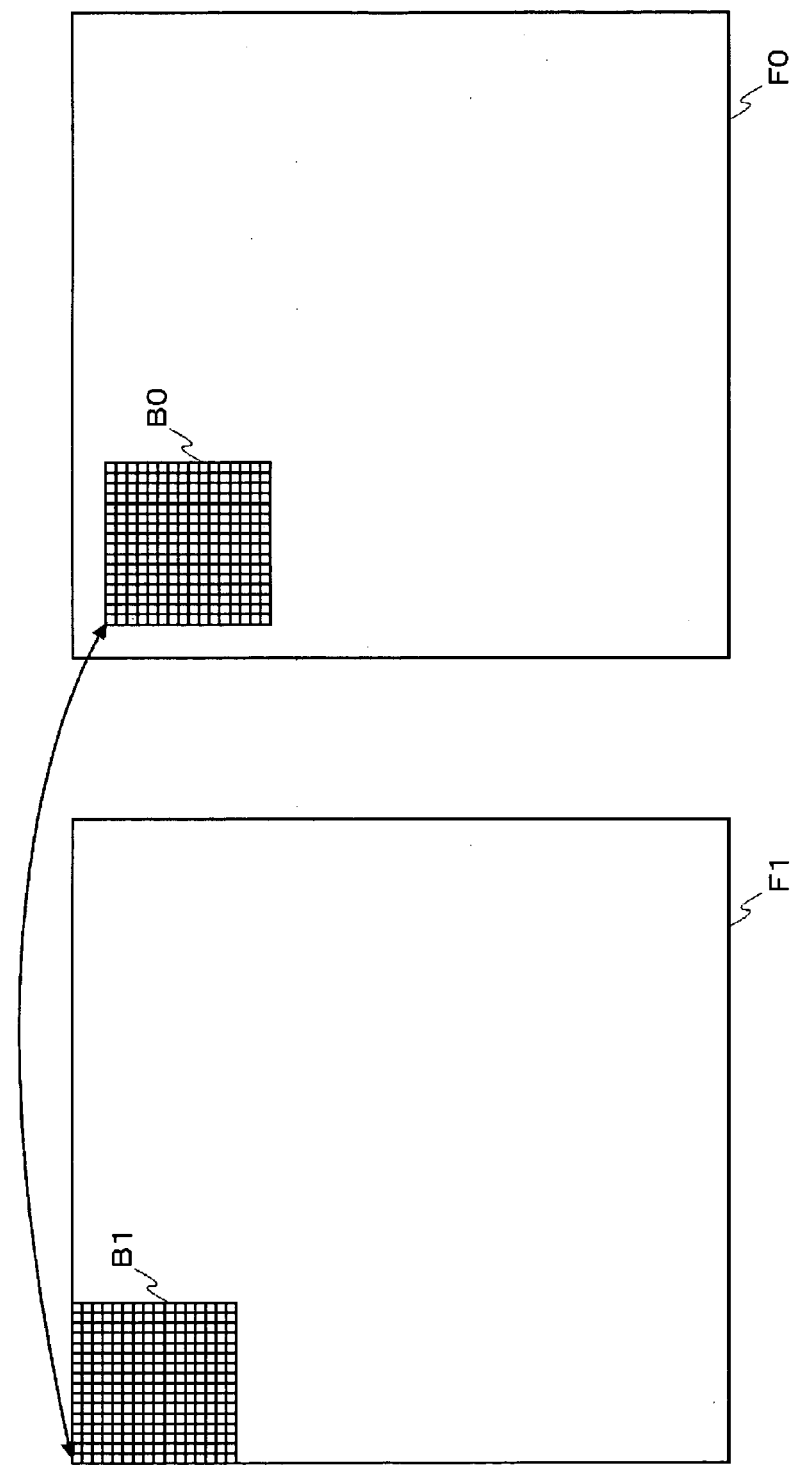
FIG. 2 illustrates an example of correlation evaluation processings in a correlation evaluation unit according to an embodiment of the present invention.

FIG. 2 illustrates an example of correlation evaluation processings in the correlation evaluation unit 72 according to an embodiment of the present invention. In FIG. 2, the correlation evaluation unit 72 evaluates the correlation between a macroblock B1 of a current frame F1 and an optimum prediction block B0 of a frame F0 in the past. The optimum prediction block B0 of 16×16 pixels indicates a block having the minimum error with respect to the macroblock B1 of 16×16 pixels.

The correlation evaluation unit 72 obtains the sum of the absolute difference of a pixel value of the macroblock B1 and a pixel value corresponding to the optimum prediction block B0. The difference may be calculated for all pixels between the frame F1 and the frame F0. Or the calculation of the difference is done in a thinning manner, for example, by calculating the difference for every other pixel. Also, the sum of squares of the difference between pixel values may be obtained.

The correlation evaluation unit 72 may obtain the sum of the absolute values or sum of squares of a difference of coefficients obtained by performing the orthogonal transform thereon, instead of obtaining the sum of the absolute values or sum of squares of a difference between the pixel value of the macroblock B1 and the pixel value corresponding to the optimum prediction block B0. In such a case, the average of difference values summarizes and represents the whole difference values in the form of a single coefficient as a direct-current component, thus making it difficult to be affected by variation in brightness. As a result, even if the brightness alone varies, the degree of correlation can be obtained accurately.

The quantization control unit 80 determines the quantization step required when the coefficients of the macroblock B1 of the current frame F1 are quantized, based on the above-described evaluation. Using the quantization step determined by the quantization control unit 80, the quantization unit 30 quantizes the coefficients of the macroblock B1 of the current frame F1.

Figure 3:
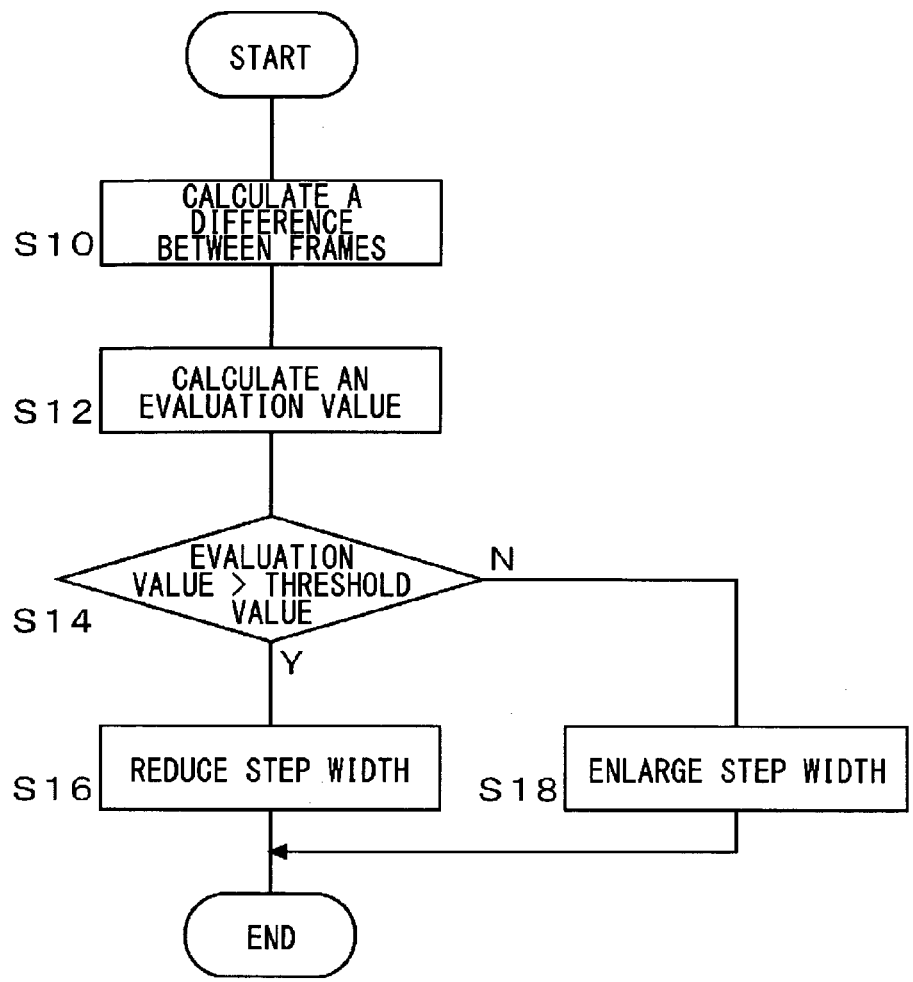
FIG. 3 is a flowchart showing a first operational example of a coding apparatus according to an embodiment of the present invention.

FIG. 3 is a flowchart showing a first operational example of the coding apparatus 100 according to an embodiment of the present invention. Note that the step width Q+ΔQ of the quantization step in small regions such as macroblocks is a basic quantization step Q, determined by the buffer occupancy or the amount of codes, added with an additional quantization step ΔQ determined by the correlation with a temporally different frame. In an example shown below, the correlation between the current frame and the frame in the past is used.

The correlation evaluation unit 72 calculates differences between pixel values or DCT coefficients in small regions corresponding to inter-frames, as described above (S10). The correlation evaluation unit 72 obtains the sum of absolute values or the sum of squares of the calculated differences and sets it as an evaluated value (S12).

The quantization control unit 80 compares the evaluated value with a predetermined threshold value (S14). This threshold value is set to a value determined through experiments or simulation runs done by a designer. If the evaluated value is greater than the predetermined threshold value (Y of S14), the quantization control unit 80 will reduce the step width Q+ΔQ of the quantization step (S16) The case where the evaluated value is greater than the predetermined threshold value means that the correlation with a frame in the past is strong. That is, it means that variation of images in the region in question is small. It is highly probable that the images in said region will remain intact. And if the images do not vary, the deterioration of image quality will be more conspicuous. Conversely, if the image quality of this region is reduced, it can be said that the subjective image quality will be reduced significantly. Hence, the step width Q+ΔQ of the quantization step is reduced by setting the additional quantization step ΔQ to a negative number, thereby enhancing the image quality.

If the evaluated value is less than the predetermined threshold value in Step 14 (N of S14), the quantization control unit 80 will enlarge the step width Q+ΔQ of the quantization step (S18). The case where the evaluated value is less than the predetermined threshold value means that the correlation with a frame in the past is small. That is, it means that variation of images in the region in question is large. It is highly probable that the images in said region will continue to vary. And if the images continue to vary, the deterioration of image quality will tend to be less conspicuous. Conversely, it can be said that reducing the image quality of this region will have little influence on the subjective image quality. Hence, the step width Q+ΔQ of the quantization step is enlarged by setting the additional quantization step ΔQ to a positive number, thereby reducing the amount of codes.

As described above, in this operational example, the step width Q+ΔQ of the quantization step in the current frame is adaptively varied according to the correlation between the current frame and a frame differing in the temporal direction. This can improve the subjective image quality while suppressing the amount of codes.

Though for simplicity a description has been given of a case where a single threshold is used, a plurality of threshold values may be used to enable a more sensitive processing. For example, cases may be divided into a category where the correlation is very strong and a category where the correlation is slightly strong. The case where the correlation is slightly strong indicates a state where an image in a region having a slightly strong correlation moves slowly or changes little by little. This region having a slightly strong correlation can be said to make it easy for a viewer to focus attention thereon. In such a case, the step width Q+ΔQ reduced in Step S18 is changed to a further reduced width Q+ΔQ. In an intermediate region where it cannot be definitely concluded whether the correlation is strong or weak, the additional quantization step ΔQ may be set to zero. Accordingly, a trade-off relation between the amount of codes and the subjective image quality can be further optimized.

Figure 4:
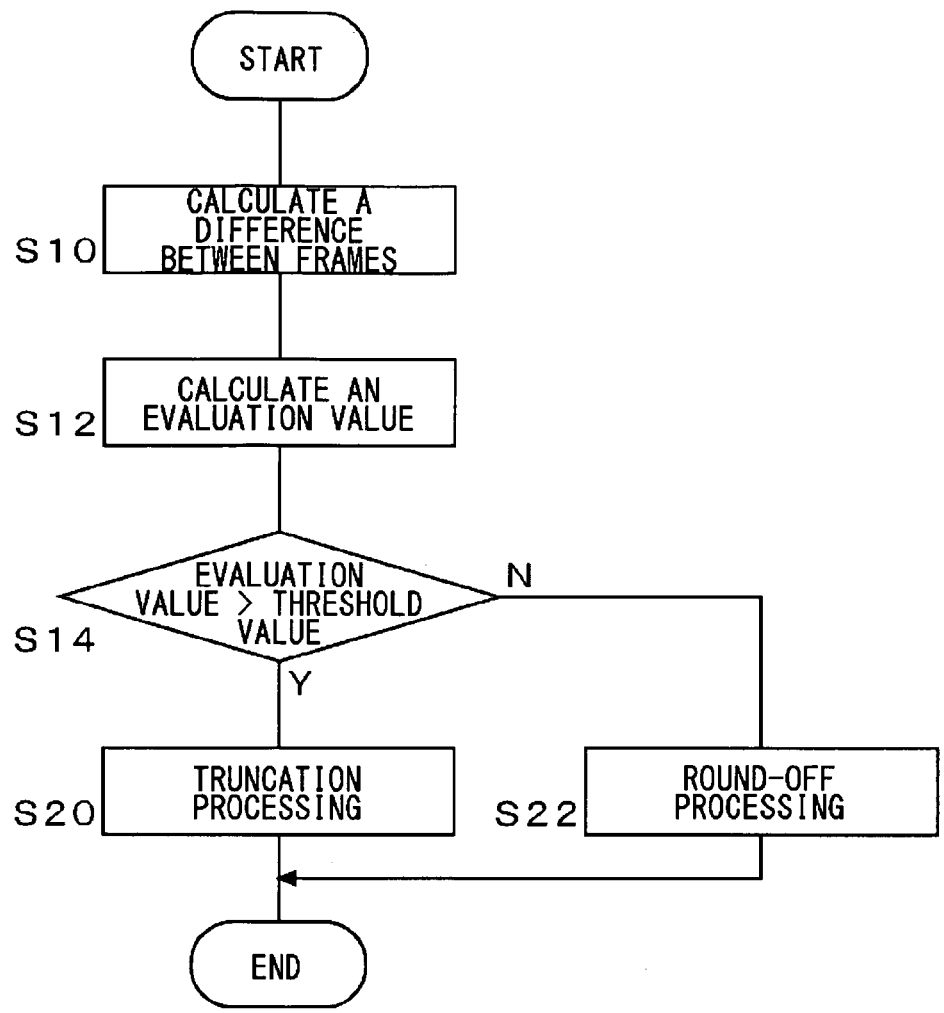
FIG. 4 is a flowchart showing a second operational example of a coding apparatus according to an embodiment of the present invention.

FIG. 4 is a flowchart showing a second operational example of the coding apparatus 100 according to an embodiment of the present invention. The second operational example is a processing where a rounding method applied at the time of quantization is adaptively varied. The quantization requires that a DCT coefficient be divided by $2^n$ (n being an integer) sequentially from the most significant bit. In so doing, when it cannot be divided exactly as a result of division by a weight of each bit, the divided value needs to be rounded in preparation for the next division. The rounding methods include a method in which digits after decimal point is simply rounded off, a method in which 0.25 is added and the number added with 0.25 is rounded off, and a method in which the number is truncated.

Up to Step S14, the processing of the second operational example has the same processing as the above-described first operational example, and thus the repeated explanation thereof is omitted here. It is to be noted that different threshold values may be used. If the evaluated value calculated in Step S12 is greater than a predetermined threshold value (Y of S14), the quantization control unit 80 will select a truncation processing as the rounding method applied at the time of quantization (S20). As described above, it is desirable that, in the region where reducing an objective image quality has little influence on the subjective image quality, the amount of codes be reduced by reducing the information amount of high frequency components allocated to low-order bits. In particular, in the image region where the movement is large, the viewer's eyes become insensitive to a small variation in brightness expressed by high frequency components. Thus, the truncation processing that may lead to the reduction in the amount of codes is used.

In Step S14, if the evaluated value is less than the predetermined threshold value (N of S14), the quantization control unit 80 will select a round-off processing as the rounding method applied at the time of quantization (S22). As described above, in the region where reducing the objective image quality also reduces the subjective image quality significantly, the image quality needs to be maintained. In such a case, the information amount of high frequency components allocated to low-order bits needs to be recorded accurately. Accordingly, used is the round-off processing by which an image relatively close to the original image can be generated.

By employing the above-described operational examples, the rounding method applied at the time of quantization is adaptively varied according to the correlation with a frame differing in the temporal direction. As a result, the subjective image quality can be improved while the amount of codes is suppressed.

The description of the present invention given above is based upon illustrative embodiments. These exemplary embodiments are intended to be illustrative only and it will be obvious to those skilled in the art that various modifications to constituting elements and processes could be developed and that such modifications are also within the scope of the present invention.

Figure 5:
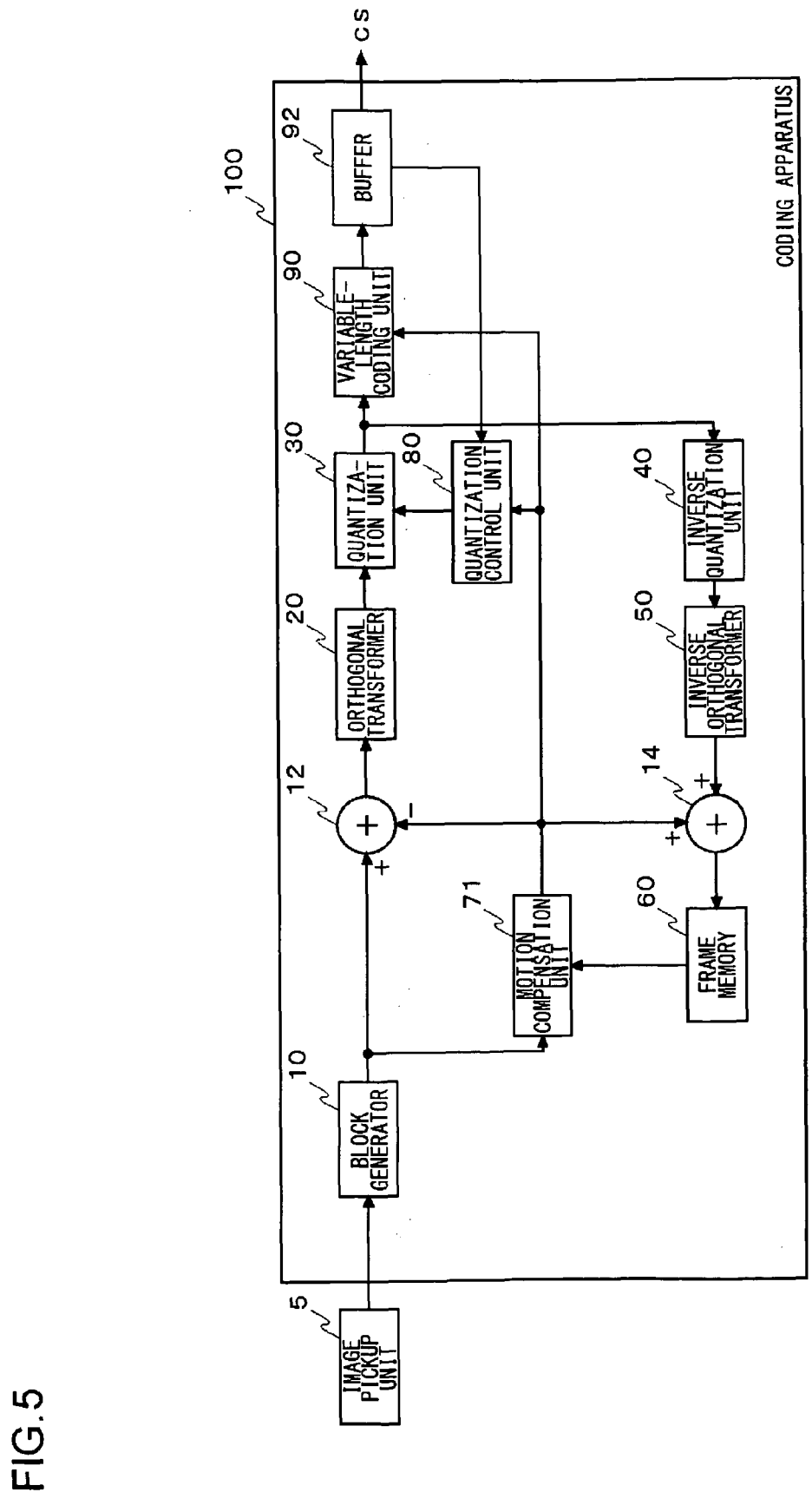
FIG. 5 illustrates a structure of an image pickup apparatus according to a modification.

FIG. 5 illustrates a structure of an image pickup apparatus 500 according to a modification. Compared with the image pickup apparatus 500 as shown in FIG. 1, the correlation evaluation unit 72 is not provided separately in the image pickup apparatus 500 according to this modification and, instead, the operation thereof is contained in the motion compensation unit 71. That is, the motion compensation unit 71 according to this modification also has a function of the correlation evaluation unit 72 shown in FIG. 1. The other components in this modification is the same as those of FIG. 1. Thus a description will be given centering around the motion compensation unit 71 and the description of the other components will be omitted as appropriate.

The motion compensation unit 71 is provided with a function of a motion detector that searches an optimum prediction region of a macroblock from a reference image and a function of a prediction image generator that generates a motion vector based on a determined prediction region and then generates prediction images based on said motion vector. A more specific description will now be given as follows. The motion compensation unit 71 uses image frames in the past or future stored in the frame memory 60, as the reference images. And, for each macroblock of frames inputted from the block generator 10, the motion compensation unit 71 searches, from at least one reference image, a prediction region having the minimum error and then obtains a motion vector indicating a displacement of the macroblock to the prediction region.

To obtain a prediction region having the minimum error, the motion compensation unit 71 calculates a difference between the pixel value of the macroblock and the pixel value of each of candidate regions to be candidates for the prediction region and then obtains the sums of the absolute differences, respectively. It is to be noted that the sum of squares thereof may be obtained instead of the sum of the absolute differences. The motion compensation unit 71 determines a candidate region, having the minimum sum of the absolute values or minimum sum of squares, to be the prediction region.

The motion compensation unit 71 performs motion compensation using a motion vector, for each macroblock and then generates a prediction image. The motion compensation unit 71 supplies the thus generated motion vector to the variable-length coding unit 90 and supplies the prediction image to the differencer 12 and the adder 14. The motion compensation unit 71 also supplies the sum of the absolute values or sum of squares calculated in the process of determining the prediction region, to the quantization control unit 80 as an evaluated value. Here, the evaluated value to be supplied may be the evaluated value of the prediction region determined or the evaluated value based on at least one evaluated value among the evaluated values of a plurality of candidate regions including the prediction region. For example, an evaluated value having the minimum prediction error and an evaluated value having the second minimum error are added together and this value may be supplied to the quantization control unit 80 as the evaluated value.

Frames for which the motion compensation unit 71 determines the prediction region and based on which the prediction image needs to be generated are P frames and B frames to be inter-frame coded. In the modification, the above described sum of the absolute values or sum of squares for I frames to be intra-frame coded are also obtained to obtain the degree of inter-frame correlation. It goes without saying that there is no need to generate the motion vector and prediction image in the case when the frames are I frames.

The quantization control unit 80 adaptively varies the quantization step in accordance with the evaluated values given from the motion compensation unit 71 and supplies it to the quantization unit 30. Also, the quantization control unit 80 varies the rounding method for values in the quantization in accordance with the evaluated values given from the motion compensation unit 71, and supplies it to the quantization unit 30.

According to the above-described modification, the evaluated value used in the process of determining the prediction region for the motion compensation is diverted to control the step width or rounding method applied at the time of quantization. This eliminates the need for separately calculating the evaluated values on which the control thus performed is based, so that the calculation amount as a whole can be reduced. Hence, this advantage also contributes to shortening the processing time and reducing the circuit scale.

Though an MPEG scheme is assumed in the above-described embodiments, the present embodiments and modifications are also applicable to a Motion-JPEG format. In the Motion-JPEG scheme, wavelet transform is used instead of DCT transform. In this case, the description on the DCT coefficients may be replaced by that of wavelet coefficients as appropriate.

While the preferred embodiments of the present invention and modifications thereto have been described using specific terms, such description is for illustrative purposes only, and it is to be understood that changes and variations may be further made without departing from the spirit or scope of the appended claims.

What is claimed:

1. A computer-implemented method for image processing, comprising:

evaluating a correlation between a predetermined region in a targeted picture and a region corresponding to the predetermined region in a picture differing from the targeted picture in a temporal direction; and adaptively varying a quantization step used for quantization of the predetermined region in the targeted picture based on the evaluated correlation between the predetermined region in the targeted picture and the corresponding region in the picture differing from the targeted picture, wherein:

the quantization step used for quantization of the predetermined region is enlarged when the evaluated correlation is weaker than a predetermined threshold value, the quantization step used for quantization of the predetermined region is reduced when the evaluated correlation is stronger than the predetermined threshold value, and the evaluating and the adaptively varying steps are performed by one or more computing devices.

2. An image processing apparatus, comprising:

a processor; and a memory accessible by the processor, the memory having processor readable instructions that when executed by the processor implement:

a correlation evaluation unit configured to evaluate a correlation between a predetermined region in a targeted picture and a region corresponding to the predetermined region in a picture differing from the targeted picture in a temporal direction; and a quantization control unit configured to adaptively control quantization processing for the predetermined region in the targeted picture, according to an evaluation value obtained from the evaluation by said correlation evaluation unit, wherein:

the evaluation value represents the correlation between the predetermined region in the targeted picture and the corresponding region in the picture differing from the targeted picture, when the evaluation value obtained by the correlation evaluation unit indicates that the correlation is weaker than a predetermined threshold value, the quantization control unit enlarges a quantization step used for quantization of the predetermined region, and when the evaluation value obtained by the correlation evaluation unit indicates that the correlation is stronger than the predetermined threshold value, the quantization control unit reduces the quantization step used for quantization of the predetermined region.

3. An image processing apparatus, comprising:
a processor; and
a memory accessible by the processor, the memory having processor readable instructions that when executed by the processor implement:
a correlation evaluation unit configured to evaluate a correlation between a predetermined region in a targeted picture and a region corresponding to the predetermined region in a picture differing from the targeted picture in a temporal direction; and
a quantization control unit configured to adaptively control quantization processing for the predetermined region in the targeted picture, according to an evaluation value obtained from the evaluation by said correlation evaluation unit, wherein:
the evaluation value represents the correlation between the predetermined region in the targeted picture and the corresponding region in the picture differing from the targeted picture,
when the evaluation value obtained by said correlation evaluation unit indicates that the correlation is weaker than a predetermined threshold value, said quantization control unit truncates a fraction produced in a division processing for quantization of the predetermined region, and
when the evaluation value obtained by said correlation evaluation unit indicates that the correlation is stronger than the predetermined threshold value, said quantization control unit rounds off a fraction produced in a division processing for quantization of the predetermined region.

4. An image processing apparatus, comprising:
a processor; and
a memory accessible by the processor, the memory having processor readable instructions that when executed by the processor implement:

a motion detector to search for a prediction region corresponding to a predetermined region of a targeted picture within a picture differing from the targeted picture in a temporal direction and to determine the prediction region in the picture differing from the targeted picture based on a comparison of evaluation values corresponding to prediction region candidates; and a quantization control unit to adaptively control quantization processing for the predetermined region in the targeted picture based on at least one of the evaluation values, wherein:

the at least one of the evaluation values represents a correlation between the predetermined region in the targeted picture and the prediction region in the picture differing from the targeted picture, when the evaluation value obtained by said motion detector indicates that the correlation between the predetermined region and the prediction region is weaker than a predetermined threshold value, said quantization control unit enlarges a quantization step used for quantization of the predetermined region, and when the evaluation value obtained by said motion detector indicates that the correlation between the predetermined region and the prediction region is stronger than the predetermined threshold value, said quantization control unit reduces the quantization step used for quantization of the predetermined region.

5. The image processing apparatus according to claim 4, wherein said quantization control unit adaptively controls the quantization processing by referring to an evaluation value of the predetermined region determined by said motion detector.

6. The image processing apparatus according to claim 4, wherein said motion detector generates the evaluation values for both a picture to be inter-picture coded and a picture to be intra-picture coded.

7. An image pickup apparatus, comprising:
image pickup devices; and
an image processing apparatus according to claim 2,
wherein said image processing apparatus performs the quantization processing on pictures taken in from said image pickup devices.

* * * * *